Figure 1:
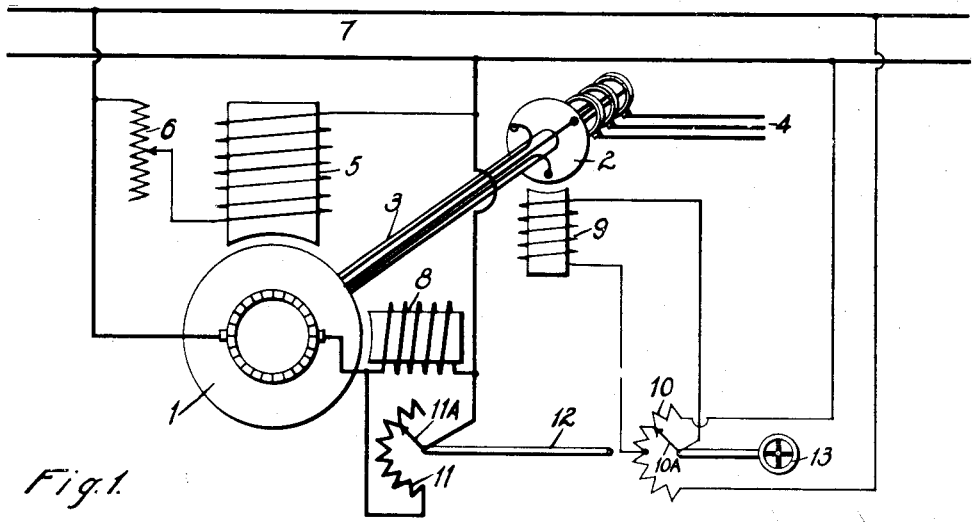

P. M. LINCOLN.
SWITCHING DEVICE.
APPLICATION FILED JULY 19, 1913.

1,197,509.

Patented Sept. 5, 1916.

WITNESSES:
R. J. Fitzgerald
D. C. Davis.

INVENTOR
Paul M. Lincoln.
BY
Wesley G. Carr
ATTORNEY

UNITED STATES PATENT OFFICE.

PAUL M. LINCOLN, OF PITTSBURGH, PENNSYLVANIA, ASSIGNOR TO WESTINGHOUSE ELECTRIC AND MANUFACTURING COMPANY, A CORPORATION OF PENNSYLVANIA.

SWITCHING DEVICE.

1,197,509.     Specification of Letters Patent.     Patented Sept. 5, 1916.

Application filed July 19, 1913. Serial No. 780,013.

*To all whom it may concern:*

Be it known that I, PAUL M. LINCOLN, a citizen of the United States, and a resident of Pittsburgh, in the county of Allegheny and State of Pennsylvania, have invented a new and useful Improvement in Switching Devices, of which the following is a specification.

My invention relates to switching devices, and it has special reference to current-regulating apparatus to be employed preferably in connection with the operation of synchronous booster rotary converters.

The object of my invention is to provide a simple, reliable and effective means for obviating certain difficulties that have been encountered in maintaining correct commutating conditions on machines of the above-indicated character.

By "synchronous booster rotary converter" I mean a machine combining a rotary converter and a mechanically associated booster having their rotor windings connected in series-circuit relation. The preferable design disposes both converter and booster on a common shaft. The field frames are cast integrally and the series rotor connections are permanent, there being no slip rings on the converter proper. The purpose of the combination is to "boost" or "buck" the incoming voltage in order to vary the direct-current voltage on the converter, as may be desired.

The synchronous booster rotary converter has different electrical characteristics from the simple rotary converter, especially as regards armature reaction. In operating the combined machine, the excitation of the field coils of the booster may be reversed, thereby causing the generated voltage to raise or lower the impressed voltage. When the field is excited so that the generated voltage "bucks" the impressed voltage, the booster acts as a motor; when the field is excited so that the generated voltage "boosts" the impressed voltage, the booster acts as a generator.

In the former case, the rotary converter, being driven by the booster, delivers some of its direct current energy as a generator, and a certain additional amount of armature reaction is combined with the simple armature reaction of the converter resulting from its own armature current. In the latter case, the rotary converter, in addition to delivering direct current energy, is acting as a synchronous motor; the additional armature reaction is, therefore, a motor or negative reaction and subtracts from the simple armature reaction.

From the foregoing theoretical considerations, it will be seen that the commutating field strength of the synchronous booster rotary converter must fulfil two requirements to successfully maintain good commutating conditions; first, the field strength must vary with the load current of the converter proper; and second, the field strength must vary according to the additional armature reaction caused by the booster current, which reaction may be either positive or negative, as hereinbefore described.

Heretofore, the first recited requirement has been recognized and fulfilled by means of a series commutating field winding connected in the main line, thus having load current flowing through the winding at all times. The second requirement, however, has caused considerable difficulty and the attempts made to attain the desired result have not been satisfactory in all cases.

According to my invention, I provide a method for fulfilling both prescribed requirements. A series commutating field winding is provided for varying the commutating field strength in proportion to the load current; and a variable resistor is shunted across the series winding or a part thereof, the contact making member of the resistor in one modification being mounted upon a common shaft with the rheostat in the booster field circuit for varying the commutating field strength in proportion to the total armature reaction of the converter, as will be understood from the following statement. As hereinbefore suggested, the additional armature reaction is proportional to the product of current and voltage delivered by the booster, and, consequently, bears predetermined relations to the field current thereof. By varying the resistor shunted across the series winding in conjunction with varying the field current of the booster, the second desired proportional change in the commutating field strength of the converter may be reliably secured.

Figure 2:
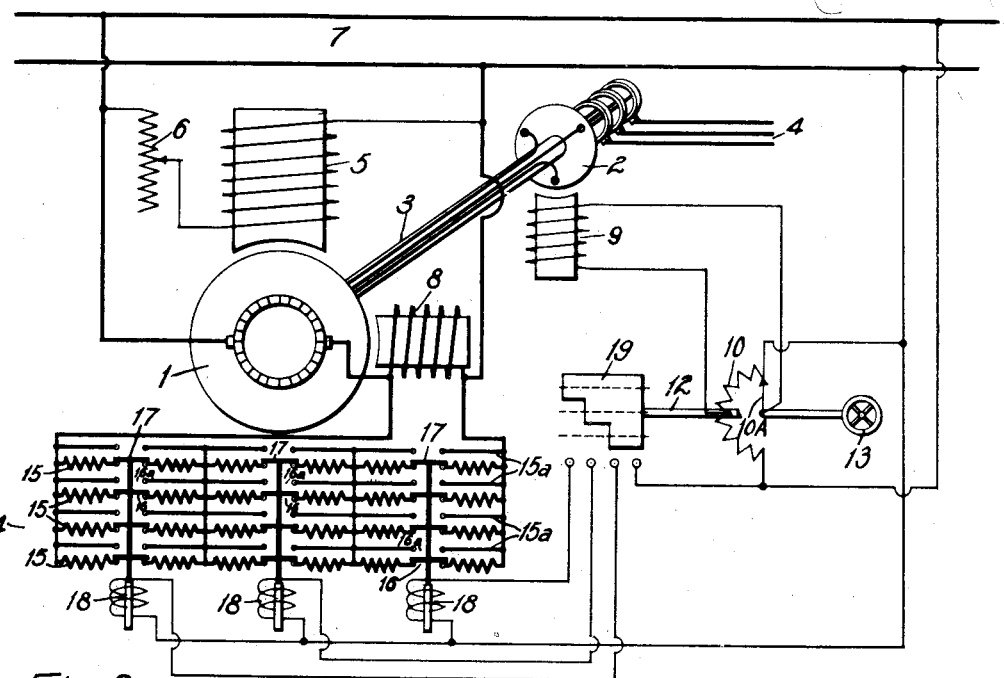
Figure 3:
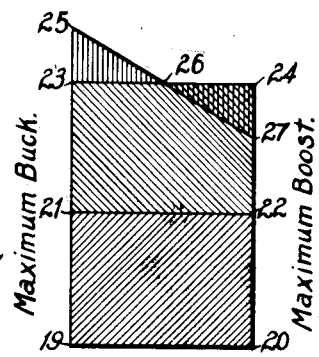

In the accompanying drawing, Figure 1 is a diagrammatic view of a system comprising a dynamo-electric machine of the class under consideration combined with a switching device constructed and arranged in accordance with my invention, Fig. 2 is a diagrammatic view of a modification thereof; and Fig. 3 is a diagram illustrating the various component fluxes in the commutating zone during the change from maximum buck to maximum boost at constant load.

Referring to the drawing, a rotary converter 1 is mechanically connected to an alternating current booster 2 by means of a common shaft 3, and the rotor windings (not shown) are electrically connected in series circuit relation. A plurality of conductors 4 serve to connect the booster 2 to an alternating current supply circuit (not shown).

The converter 1 is provided with a main shunt field winding 5 which is connected in series with a suitable rheostat 6 across the direct current line 7, and with a series commutating field winding 8 which is connected in the main line 7, thus carrying at all times a current which varies in proportion to the load current. The booster 2 has a shunt field winding 9 which is connected through a suitable reversing rheostat 10 to the direct current line and a second rheostat 11 of large current-carrying capacity is adjustably shunted across the series winding 8. The contact arms 10ª and 11ª of the rheostats 10 and 11 are mounted upon a common shaft 12, which may be provided with a suitable operating handle 13.

Reference may now be had to Fig. 2, which illustrates one modification of my invention that may be employed where a relatively large current is to be shunted from the series field winding 8. In brief, a suitable relaying device is employed. A resistor 14 comprises a plurality of parallel shunts 15 of large current-carrying capacity severally having a plurality of gaps or openings 16. Intermediate leads 15ª are provided with a plurality of openings 16ª. The openings 16 may be normally bridged by certain of a plurality of multi-contact movable members 17 which are also severally disposed to bridge the corresponding openings 16ª in the several leads 15ª when respectively actuated by coils 18, and thereby insert different resistances across the series winding 8. The movable member of a cotroller 19 is mounted on the common rheostat shaft 12 and is provided with suitable contact pieces to engage coöperating stationary contact members for closing connections from the direct current line 7 to the coils 18.

The operation of the apparatus shown in Fig. 1 may be described as follows: When a change in load conditions occurs, the reversing rheostat 10 is actuated manually or otherwise to cause a corresponding change in booster voltage and thus maintain a predetermined direct current voltage on the converter. Since the rheostat 11 is mounted on the same shaft 12 as the rheostat 10, the former is also actuated and a suitable change is made in the series commutating field current by reason of the changed shunting connection of the rheostat 11, correct commutating conditions corresponding to the altered total armature reaction being thus maintained.

The operation of the device shown in Fig. 2 is basically quite similar to that just described. The controller 19 is actuated with the booster field rheostat 10 and, consequently, energizes one or more of the coils 18, whereby the movable contact members 17 are actuated to change the amount of resistance that is shunted across the series winding 8. It will be noted that, when the first member 17 is actuated, the resistors at the left hand end of the device 14 are eliminated and the resistance of the shunt around the winding 8 lowered as in the corresponding adjustment in Fig. 1. Subsequently as each device 17 is operated, more and more resistance is eliminated from the shunt circuit until in the final position of the member 19, all resistance is eliminated therefrom and the load current divides between the series winding 8 and the shunt therearound in accordance with the relative resistance, a large amount of current still flowing in the series winding because of the inherent extremely low resistance of windings of this character.

In the diagram of Fig. 3, illustrating the various fluxes supplied to the commutating zone during the transition from maximum buck to maximum boost at constant load, the line 19—25 represents the flux supplied at maximum buck. The portion 19—21 is employed to provide the commutating field, the portion 21—23 to neutralize the normal generator reaction of the rotary under the brushes, and the portion 23—25 to neutralize the additional generator reaction caused by the bucking booster operating as a motor and driving the rotary converter as a generator. Upon passing to the condition of maximum boost, the fluxes employed for providing the commutating field and for neutralizing the normal generator reaction remain constant, being represented respectively, by the lines 20—22 and 22—27. The booster is now operating, however, as a generator and developing motor reaction in the rotary converter armature, said motor reaction being shown by a line 24—27 and tending to neutralize a portion of the normal generator. Hence the net resultant flux necessary at maximum boost is represented by the line 20—27 and is much less in amount than the flux at maximum buck, represented by the line 19—25. Accordingly, in applicant's structure, the current in the series winding 8 should be reduced in the ratio of the distances 20—27 to 19—25 by the shunting action of the devices 11 or 14 in passing from a condition of maximum buck to one of maximum boost at constant load.

It is thus unnecessary to actually reverse the direction of current in the series winding at any time, as is done with the auxiliary winding in those types of rotary converter where there is provided a series commutating winding for providing the flux 19—20—24—23 and an additional auxiliary commutating winding adjusted in consonance with the booster field winding to produce the fluxes 23—25—26 and 26—24—27.

It will be understood that a direct current booster may be employed in lieu of the alternating current booster shown in the drawing and that the circuit connections and structural arrangements may be variously modified within the spirit and scope of my invention. I, therefore, desire that only such limitations shall be imposed as are indicated in the appended claims.

I claim as my invention:

1. The combination with a dynamo-electric machine adapted to deliver alternating and direct current and provided with a series connected field winding, and a second dynamo-electric machine mechanically associated with said first machine and electrically connected in series therewith and provided with a field circuit, of current varying means included in said field circuit and means mechanically associated with said first means for shunting a portion of the armature current from said series connected winding.

2. The combination with a dynamo-electric machine adapted to deliver alternating and direct current and provided with a series-connected field winding, and a second dynamo-electric machine mechanically associated with said first machine and electrically connected in series therewith and provided with a field circuit, of an adjustable resistor included in said field circuit, and means mechanically associated with the movable member of said resistor for shunting a portion of the armature current from said series-connected winding.

3. The combination with a dynamo-electric machine adapted to deliver alternating and direct current and provided with a series-connected field winding, and a second dynamo-electric machine mechanically associated with said first machine and electrically connected in series therewith and provided with a field circuit, of current varying means included in said field circuit for regulating the voltage of said second machine, and simultaneously operated means for shunting variable predetermined resistances across said series-connected winding for maintaining good commutating conditions on said first machine.

4. The combination with a dynamo-electric machine adapted to deliver alternating and direct current and provided with a series-connected field winding, and a second dynamo-electric machine mechanically associated with said first machine and electrically connected in series therewith and provided with a field circuit, of current varying means included in said field circuit, a second adjustable resistor connected in parallel with said series-connected winding, and simultaneously operated means for varying the proportion of line current in said winding.

5. The combination with a dynamo-electric machine adapted to deliver alternating and direct current and provided with a series-connected field winding, and a second dynamo-electric machine mechanically associated with said first machine and electrically connected in series therewith and provided with a field circuit, of an adjustable resistor included in said field circuit, a second resistor adjustably shunted across said series-connected winding, and a common operating shaft for the movable member of said first resistor and the adjusting means for said second resistor.

6. The combination with a rotary converter provided with a series-connected commutating field winding, and an alternating current booster mechanically associated with said converter and electrically connected in series therewith and provided with a shunt field winding, of an adjustable resistor disposed in series with said shunt field, a second resistor adjustably connected in parallel with said series-connected winding, and a common operating shaft for said resistors for simultaneously regulating the voltage and securing good commutating conditions on said converter.

7. The combination with a dynamo-electric machine adapted to deliver alternating and direct current and provided with a series-connected field winding, and a second dynamo-electric machine mechanically associated with said first machine and electrically connected in series therewith and provided with a field circuit, of current varying means included in said field circuit, an adjustable resistor shunted across said series-connected winding, switching means for varying the shunting portion of said second resistor, and simultaneously operated means for manipulating said switching means.

8. The combination with a rotary converter provided with a series-connected commutating field winding, and an alternating current booster mechanically associated with said converter and electrically connected in series therewith and provided with a shunt field winding, of an adjustable resistor disposed in series with said shunt field, a second adjustable resistor connected in parallel with said series-connected winding, a plurality of movable contact members for varying the parallel-connected portion of said second resistor, a plurality of coils for severally actuating said contact members, a controlling switch for predeterminedly energizing said coils, and a common operating shaft for said first resistor and the movable contact member of said switch for simultaneously regulating the voltage and securing good commutating conditions on said converter.

In testimony whereof I have hereunto subscribed my name this 16th day of July, 1913.

PAUL M. LINCOLN.

Witnesses:
F. M. PARKS,
B. B. HINES.